United States Patent [19]
Proctor

[11] Patent Number: 5,940,361
[45] Date of Patent: Aug. 17, 1999

[54] CARTRIDGE HAND OFF SELECTION MECHANISM

[75] Inventor: Robert Dale Proctor, Loveland, Colo.

[73] Assignee: Hewlett-Packard Company, Palo Alto, Calif.

[21] Appl. No.: 08/253,641

[22] Filed: Jun. 3, 1994

[51] Int. Cl.[6] .................................................. G11B 17/04
[52] U.S. Cl. .......................... 369/191; 369/77.1; 369/79
[58] Field of Search .................................. 369/191, 77.1, 369/77.2, 79; 360/99.02; 414/940

[56] References Cited

U.S. PATENT DOCUMENTS

| | | | |
|---|---|---|---|
| 4,669,076 | 5/1987 | Broom et al. | 369/77.2 |
| 4,736,356 | 4/1988 | Konshak | 360/99.02 |
| 4,904,153 | 2/1990 | Iwasawa et al. | 414/940 |
| 4,998,232 | 3/1991 | Methlie et al. | 369/36 |
| 5,010,536 | 4/1991 | Wanger et al. | 369/36 |
| 5,014,255 | 5/1991 | Wanger et al. | 369/36 |
| 5,043,962 | 8/1991 | Wanger et al. | 369/36 |
| 5,062,093 | 10/1991 | Christie et al. | 369/36 |
| 5,101,387 | 3/1992 | Wanger et al. | 369/36 |
| 5,146,375 | 9/1992 | Satoh et al. | 360/92 |
| 5,184,336 | 2/1993 | Wanger et al. | 369/34 |
| 5,245,602 | 9/1993 | Ikedo et al. | 369/191 |

FOREIGN PATENT DOCUMENTS

| | | |
|---|---|---|
| 0063894 | 11/1982 | European Pat. Off. . |
| 0382393 | 8/1990 | European Pat. Off. . |
| 0407305 | 1/1991 | European Pat. Off. . |

OTHER PUBLICATIONS

U.S. application No. 08/135,607, Rugg et al., Filed Oct. 12, 1993

U.S. application No. 08/135/607, Luffel et al., filed Oct. 12, 1993.

*Primary Examiner*—Sara Crane

[57] ABSTRACT

A cartridge hand off selection mechanism may comprise a gate member positioned along the displacement path of a moveable cartridge engaging assembly. The gate member is displaceably engageable by a latch member on the moveable cartridge during a first operating state and is nondisplaceably engageable with the latch member during a second operating state.

12 Claims, 6 Drawing Sheets

CARTRIDGE HAND OFF SELECTION MECHANISM

BACKGROUND

This invention relates to generally to systems for handling and storing media cartridges such as optical disk or tape cartridges and, more particularly, to apparatus for passively engaging and releasing a media cartridge.

An optical disk is a data storage medium which is readable by a laser-based reading device. Optical disks known as "compact disks" or "CDs" have become increasingly popular during the last decade for recording music and audio-visual works. Due to the large storage capacity of optical disks as compared to conventional magnetic storage media, optical disks known as "ROM disks" have become popular for storing computer readable information. However, until very recently, optical disks were of somewhat limited use in the computer industry due to the fact that optical disks could not be erased and written with new information, i.e., ROM disks are "read only" memory devices. However, recent technology has produced optical disks which are both computer readable and computer writable. Consequently, optical disks are expected to become increasingly more important in the computer industry and may eventually replace magnetically readable and writable storage media such as floppy disks and hard disks. Another recent development, the ability to provide data storage on both surfaces on an optical disk, has effectively doubled the storage capacity of the optical disk. Optical disks of the type used in computer applications are generally mounted in parallelepiped-shaped cartridges. Also used in the computer industry for data storage are parallelepiped-shaped tape cartridges such as Digital Audio Tape (DAT) cartridges and 8 mm tape cartridges.

Cartridge reading devices generally receive a cartridge which is to be read through a narrow slot provided on the front surface of the device. While such cartridges may be inserted by hand into cartridge readers, large databases consisting of many cartridges usually require a cartridge storage system for storing the cartridges at known locations, and a cartridge handling system which is capable of retrieving a desired cartridge from a storage location and inserting the cartridge into a cartridge reader. Various features and components of cartridge handling systems, as well as cartridge engaging assemblies in general, are disclosed in U.S. Pat. Nos. 4,998,232 for OPTICAL DISK HANDLING APPARATUS WITH FLIP LATCH of Methlie et al.; U.S. Pat. No. 5,014,255 for OPTICAL DISK CARTRIDGE HANDLING APPARATUS WITH PASSIVE CARTRIDGE ENGAGEMENT ASSEMBLY of Wanger, et al.; U.S. Pat. No. 5,010,536 for CARTRIDGE HANDLING SYSTEM of Wanger et al.; U.S. Pat. No. 5,043,962 for CARTRIDGE HANDLING SYSTEM of Wanger, et al.; U.S. Pat. No. 5,062,093 for OPTICAL DISK INSERTION APPARATUS of Christie, et al.; U.S. Pat. No. 5,101,387 for LATERAL DISPLACEMENT CONTROL ASSEMBLY FOR AN OPTICAL DISK HANDLING SYSTEM of Wanger, et al.; U.S. Pat. No. 5,184,336 for LATERAL DISPLACEMENT CONTROL ASSEMBLY FOR AN OPTICAL DISK HANDLING SYSTEM of Wanger, et al.; U.S. patent application Ser. Nos. 08/020,160 filed Feb. 18, 1993 for LATERAL DISPLACEMENT AND SUPPORT APPARATUS FOR USE IN A CARTRIDGE HANDLING SYSTEM of Luffell, et al.; and 08/135,607 filed Oct. 12, 1993 for CARTRIDGE HANDLING SYSTEM WITH DUAL CARTRIDGE ENGAGING ASSEMBLY, which are each hereby specifically incorporated by reference for all that is disclosed therein.

In general, a cartridge handling system may include a cartridge storage system for storing the cartridges at corresponding storage locations. Such a system may also include a cartridge engaging assembly which may perform such functions as retrieving a desired cartridge from its corresponding storage location, transporting the cartridge to a disk or tape drive, and inserting the cartridge into the drive. A cartridge engaging assembly may also remove a cartridge from a drive, move the cartridge into alignment with its storage location, and return the cartridge to its storage location. It may also be necessary for the cartridge engaging assembly to flip a cartridge before insertion or reinsertion into a drive to reverse the side thereof which is read or written by the drive.

While many different kinds of engaging apparatus have been developed for releasably engaging the cartridges in such cartridge handling systems, such engaging apparatus have tended to require either separate direct actuators or clutch assemblies or relatively complex, passively actuated mechanical arrangements. For example, the engaging apparatus shown in U.S. Pat. No. 5,014,255 utilizes a relatively complex pin-in-track arrangement to actuate the engaging apparatus. Such complex mechanical arrangements are relatively expensive to manufacture. Other mechanical arrangements can limit the maximum extension of the engaging apparatus, thus requiring that the cartridges be positioned in close proximity to the engaging apparatus, which can also cause problems. In order to decrease production and maintenance costs and to increase the reliability of a cartridge handling system, it is generally desirable to minimize or eliminate the type of mechanical systems, such as actuators and clutch assemblies, which are particularly subject to malfunction under frequent use conditions. It is also generally desirable minimize the number of components in such an assembly.

SUMMARY OF THE INVENTION

A cartridge hand off selection mechanism according to this invention may comprise a gate member positioned along the displacement path of a moveable cartridge engaging assembly. The gate member is displaceably engageable by a latch member on the moveable cartridge during a first operating state and is nondisplaceably engageable with the latch member during a second operating state.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
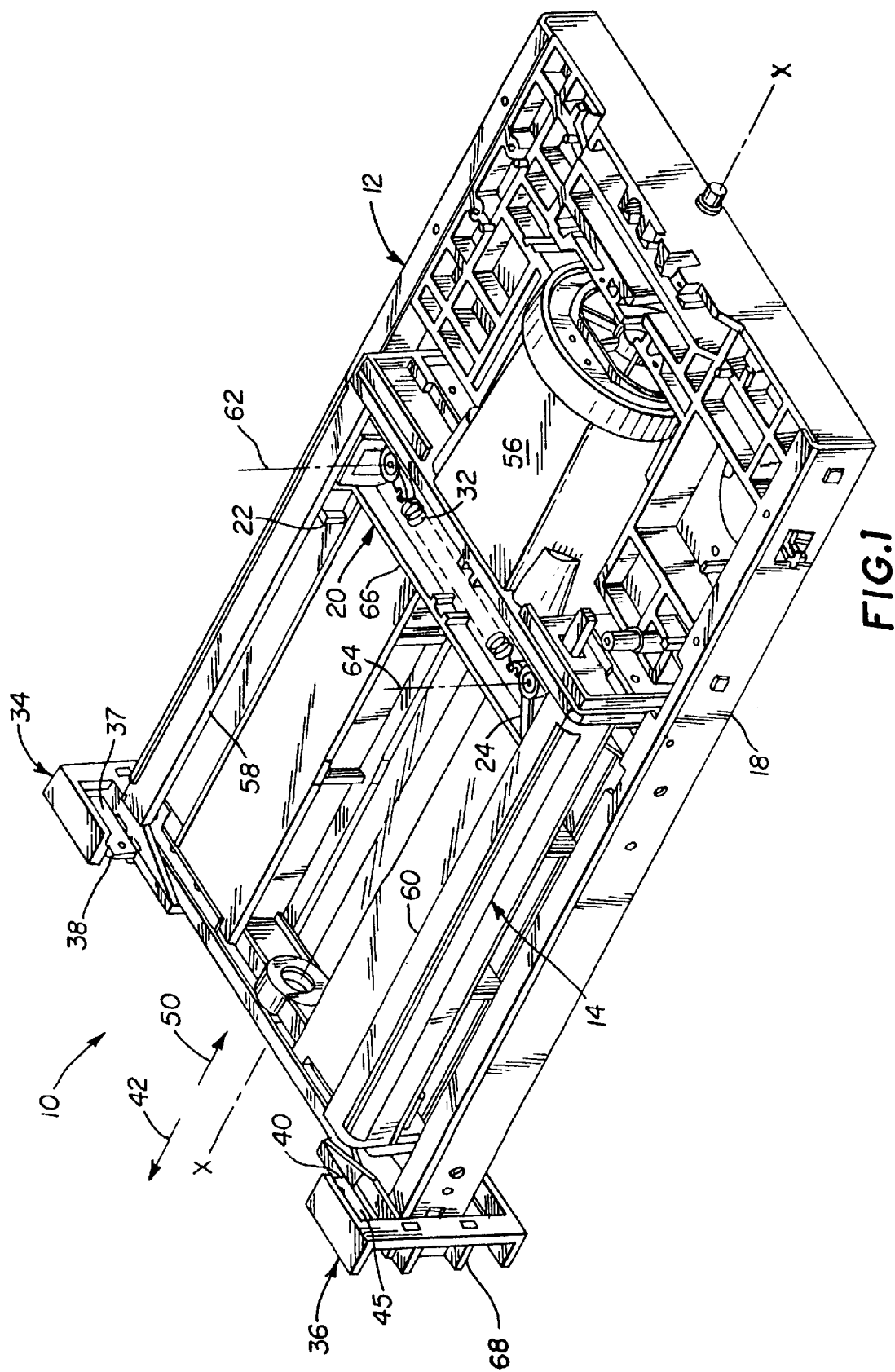
FIG. 1 is a perspective view of a cartridge hand off selection mechanism.
Figure 2:
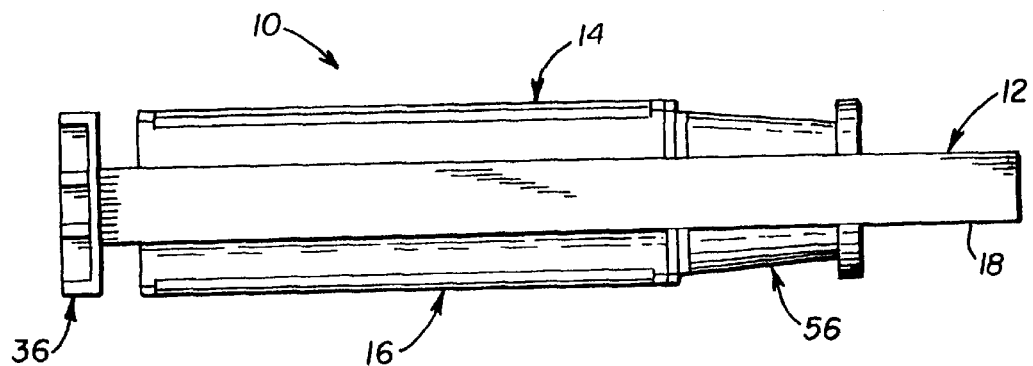
FIG. 2 is a side view in elevation of the cartridge hand off selection mechanism shown in FIG. 1.
Figure 3:
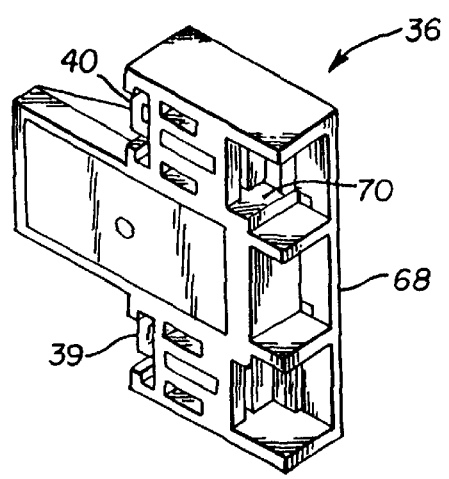
FIG. 3 is a perspective view of a gate guide assembly.
Figure 4:
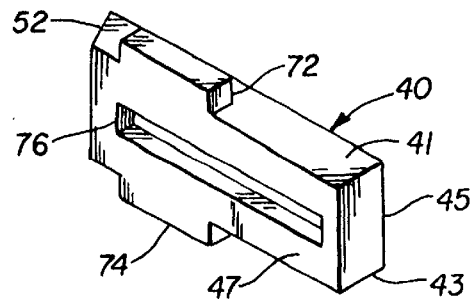
FIG. 4 is a perspective view of a gate member.
Figure 5:
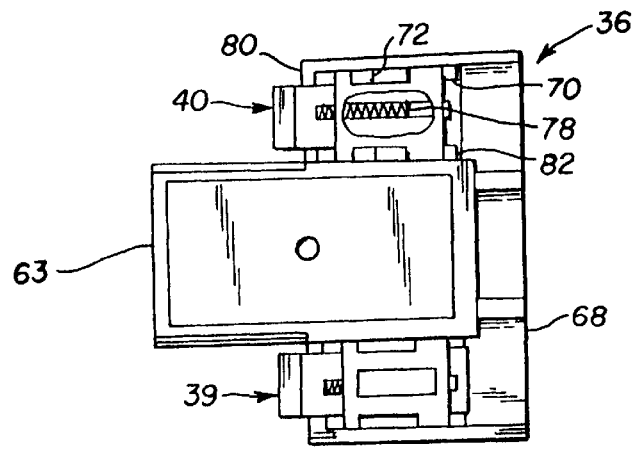
FIG. 5 is an elevation view of the gate guide assembly shown in FIG. 3.
Figure 6:
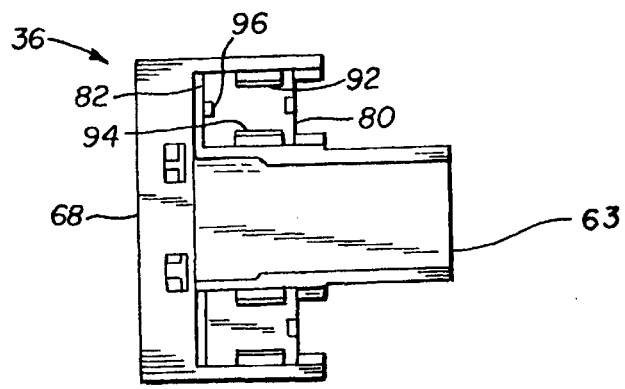
FIG. 6 is an elevation view of the reverse side of the gate guide assembly shown in FIG. 5.
Figure 7:
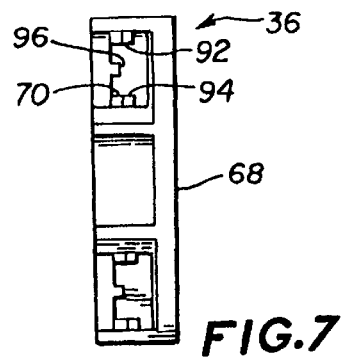
FIG. 7 is a side view in elevation of the gate guide assembly.

A cartridge hand off selection mechanism 10 according to one embodiment of the present invention is shown in FIG. 1. In this embodiment the selection mechanism 10 is used with a dual cartridge engaging assembly 12, such as the type shown in U.S. patent application Ser. No. 08/135,607 filed Oct. 12, 1993 for CARTRIDGE HANDLING SYSTEM WITH DUAL CARTRIDGE ENGAGING ASSEMBLY, incorporated by reference above. Briefly, dual cartridge engaging assembly 12 includes a first cartridge engaging assembly 14 and a second cartridge engaging assembly 16 mounted in opposed, back-to-back relation on opposite sides of a frame assembly 18, as best seen in FIG. 2. In one preferred embodiment, the first and second cartridge engaging assemblies 14 and 16 are substantially identical and are operated independently of each other by a suitable cartridge actuator assembly 56 such as, for example, the type shown and described in U.S. patent application Ser. No. 08/135, 607, incorporated by reference above. Since the first and second cartridge engaging assemblies 14 and 16 may be substantially identical, only the first cartridge engaging assembly 16 is shown and described in detail herein.

Figure 8:
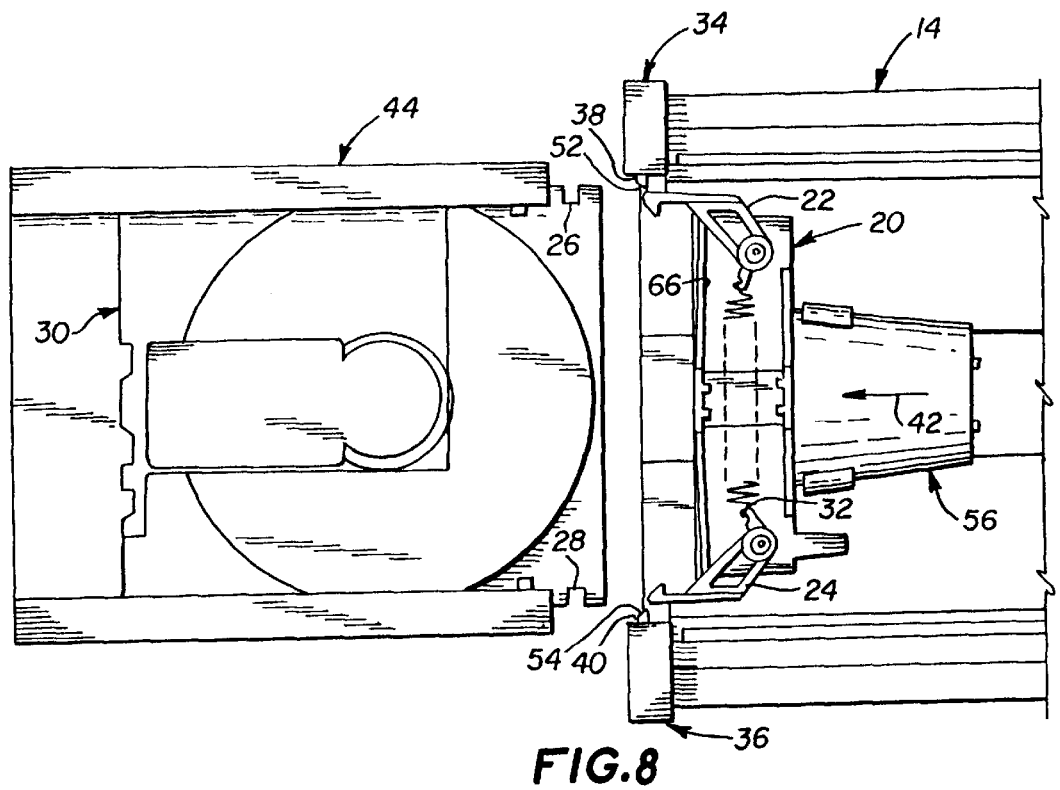
FIG. 8 is a plan view of the cartridge hand off selection mechanism at a first position in the go-get operating mode.

The first cartridge engaging assembly 14 is displaceable along a longitudinal axis XX (FIG. 1) in either an extending direction 42 or a retracting direction 50 to accomplish the various operating modes of "go-get," i.e., moving toward and engaging a cartridge which is in a storage location; "retrieve," i.e., pulling the engaged cartridge out of the storage location; "put," i.e., putting a cartridge into a storage location and releasing it; and "return," i.e., returning empty to a home position after disengaging from a cartridge, as will be described in detail below. Cartridge engaging assembly 14 includes a thumb assembly 20 mounted to a suitable cartridge actuator assembly 56, which may be of the type described in U.S. patent application Ser. No. 08/135,607. An opposed pair of latch members 22 and 24 are pivotally mounted to thumb assembly 20 and are adapted to engage corresponding slots 26 and 28 in a cartridge, such as optical disk cartridge 30, as best seen in FIG. 8. Opposed latch members 22 and 24 are biased in an inward, retracted position by a suitable biasing member, such as a spring 32.

Figure 10:
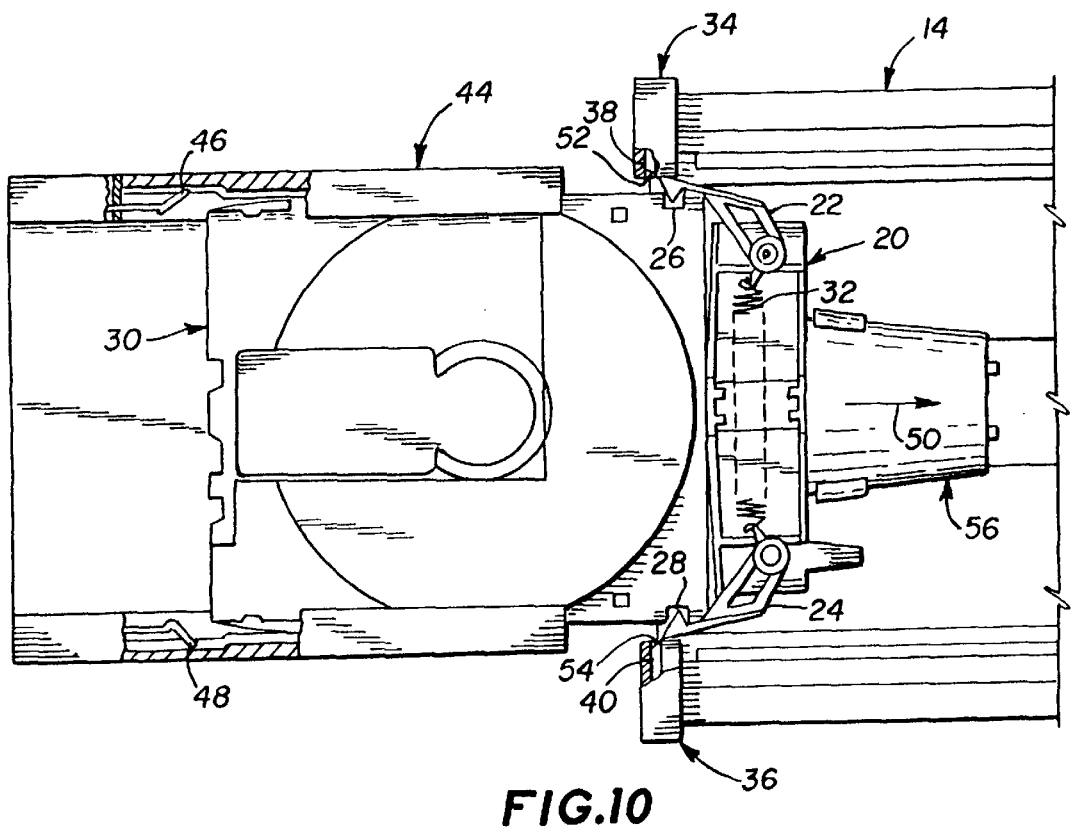
FIG. 10 is a plan view of the cartridge hand off selection mechanism in the retrieve mode.

The cartridge hand off selection mechanism 10 also includes a pair of opposed gate guide assemblies 34 and 36 mounted to the frame assembly 18, as best seen in FIG. 1. Briefly, each gate guide assembly 34, 36 includes a respective gate 38, 40 slidably mounted therein so that each gate 38, 40 can slide in its respective gate guide assembly 34, 36 from an extended position (see, for example, FIG. 1) to a retracted position (FIG. 10). Each gate 38, 40 is spring biased in the extended position.

Each latch member 22 and 24 is adapted to engage a corresponding gate 38 and 40 in each respective gate guide assembly 34, 36 during any of the four operating modes of the cartridge hand off selection mechanism 10 (i.e., "go-get," "retrieve," "put," and "return") to accomplish the functions of "go getting" a cartridge, retrieving a cartridge, "putting" a cartridge, and returning to a home or retracted position without a cartridge.

Figure 9:
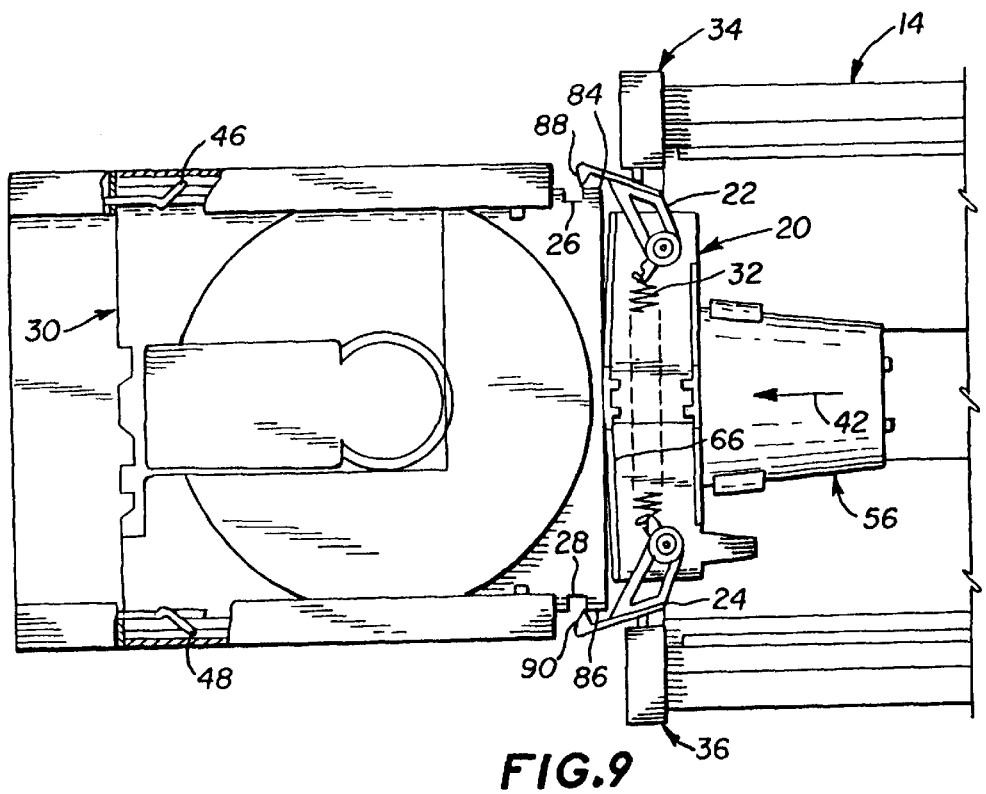
FIG. 9 is a plan view of the cartridge hand off selection mechanism at a subsequent position in the go-get operating mode.

More specifically, during a go-get operating mode, shown in FIGS. 8 and 9, the cartridge engaging assembly 14 moves from a home or retracted position (shown in FIG. 1) to a fully extended position along an extending direction 42 that is substantially parallel to longitudinal axis XX. In the position shown in FIG. 8, the extended gates 38 and 40 of respective guide gate assemblies 34 and 36 allow the retracted latch members 22, 24 to pass without interference. As the thumb assembly 20 continues to move in the extending direction 42, the latch members 22, 24 are displaced outwardly by cartridge 30, as shown in FIG. 9, whereupon they will snap into the corresponding slots 26, 28 of cartridge 30, thus engaging cartridge 30. After the cartridge 30 has been engaged by thumb assembly 20 of cartridge engaging assembly 14, cartridge actuator assembly 56 stops thumb assembly 20 to end the go-get mode and begins to move it in a retracting direction 50, thus withdrawing cartridge 30 from engaging clips 46, 48 of cartridge magazine 44 to begin the retrieve mode.

In the portion of the retrieve operating mode shown in FIG. 10, the cartridge actuator assembly 56 continues to move the thumb assembly 20 and engaged cartridge 50 in the retracting direction 50, so that the cartridge 30 is withdrawn from magazine 44. In so moving, the latch members 22, 24 engage the respective beveled edges 52, 54 of gates 38, 40, pushing the gates 38, 40 into a retracted position within respective gate guide assemblies 34, 36. The retracted gates 38 and 40 thus allow the thumb assembly 20 and cartridge 30 to be retracted into the dual cartridge engaging assembly 12.

Figure 11:
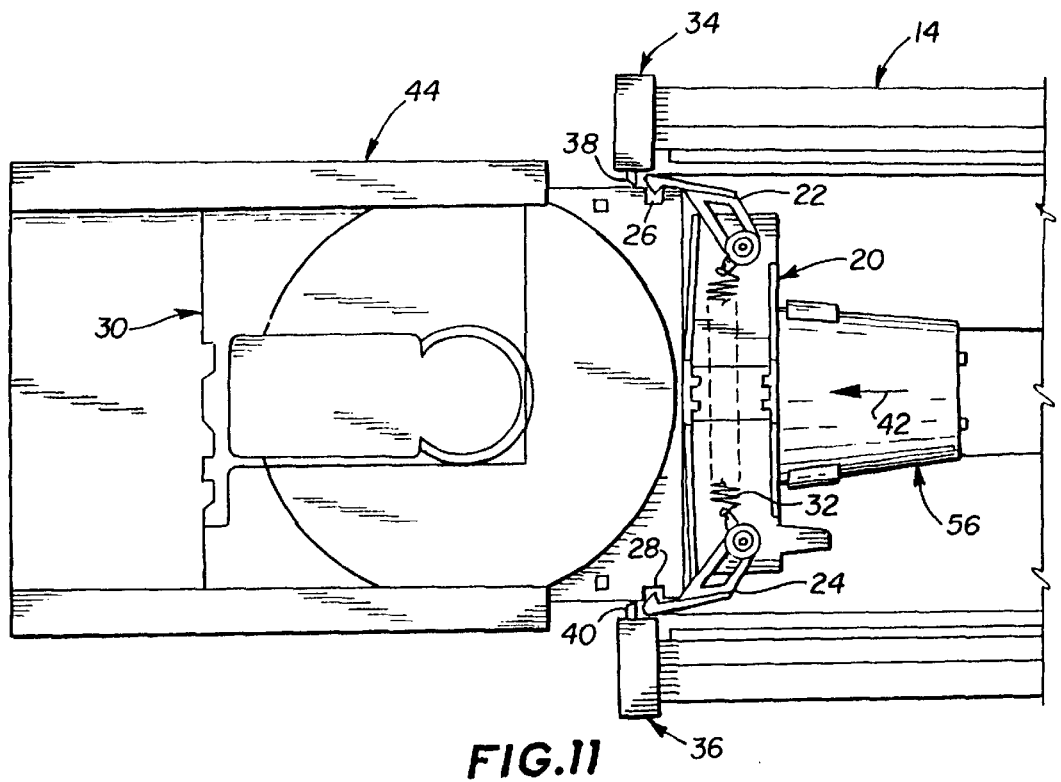
FIG. 11 is a plan view of the cartridge hand off selection mechanism at a first position in the put mode.
Figure 12:
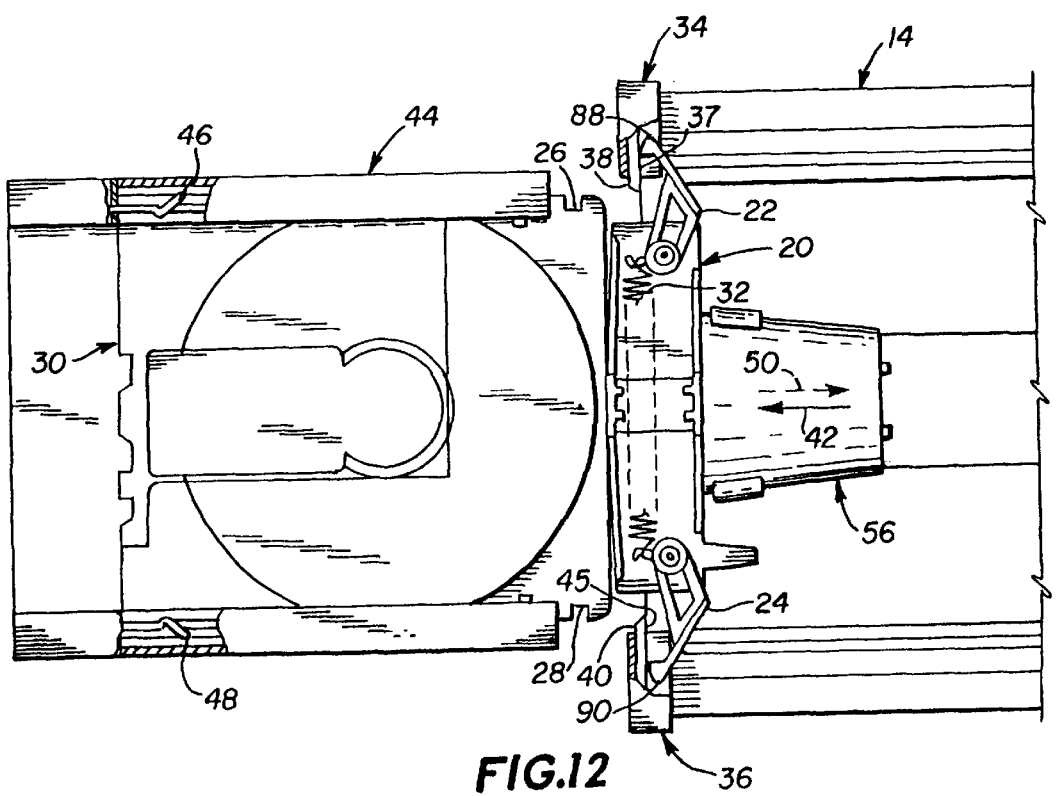
FIG. 12 is a plan view of the cartridge hand off selection mechanism at a subsequent position in the put mode.

The put operating mode of the cartridge hand off selection mechanism 10 is best seen in FIGS. 11 and 12. The first portion of the put mode of operation is that portion where the actuator assembly 56 is moving the thumb assembly 20 and engaged cartridge 30 from the retracted position (the position of the thumb assembly 20 shown in FIG. 1, except that the thumb assembly 20 is engaged with a cartridge) to the position shown in FIG. 11, wherein the latch members 22 and 24 begin to engage the respective extended gates 38 and 40. Continued movement of the thumb assembly 20 in the extending direction 42 causes the latch members 22, 24 to be displaced to the extended positions shown in FIG. 12. So extended, the latch members 22 and 24 release the cartridge 30. Actuator assembly 56 then continues moving the thumb assembly 20 in the extending direction 42, pushing the disengaged cartridge 30 in the extending direction 42 until it is engaged in the magazine 44 (FIG. 12), or until it is engaged in a suitable cartridge reader (not shown).

In the return operating mode, actuator assembly 56 reverses the direction of the now empty thumb assembly 20, and returns it to the retracted position shown in FIG. 1.

A significant advantage of the cartridge hand off selection mechanism 10 according to one embodiment of the present invention is that the cooperation of the latch members 22 and 24 with the corresponding gates 38 and 40 in respective gate guide assemblies 34 and 36 allows for the passive actuation of the latch members 22, 24 to selectively engage and disengage a cartridge 30. The cartridge hand off selection mechanism 10 therefore does away with the need to provide a separate actuator to engage and disengage the latch members from the cartridge. The mechanism 10 also does away with the need for relatively complex pin-and-track arrangements to actuate the latch members. Another advantage of the cartridge hand off selection mechanism 10 is that it is not limited to use with a dual cartridge engaging assembly 12 shown and described herein, and can be used just as easily with a single cartridge engaging assembly of the type shown in U.S. Pat. No. 5,014,255 incorporated by reference above.

The details of the cartridge hand off selection mechanism 10 are best seen in FIG. 1. As was described above, the mechanism 10 is shown and described herein as it could be used on a dual cartridge engaging assembly 12 of the type shown and described in U.S. patent application Ser. No. 08/135,607, incorporated by reference above, and includes a first cartridge engaging assembly 14 and a second cartridge engaging assembly 16 positioned in spaced apart, back-to-back relation on opposite sides of the frame assembly 18, as best seen in FIG. 2. A suitable cartridge actuator assembly 56, such as the type shown and described in U.S. patent application Ser. No. 08/135,607, is used to selectively actuate either the first or second cartridge engaging assembly 14 or 16, according to the particular requirements of the cartridge handling system (not shown). The first and second cartridge engaging assemblies 14, 16 are essentially identical, so only the cartridge engaging assembly 14 is shown and described in detail herein.

Cartridge engaging assembly 14 comprises a thumb assembly 20 that is adapted to slide between opposed guide rails 58 and 60. Thumb assembly 20 is operatively mounted to cartridge actuator assembly 56 which can selectively move the thumb assembly 20 in an extending direction 42 and a retracting direction 50. Latch members 22 and 24 are pivotally mounted to thumb assembly 20 along respective pivot axes 62 and 64, and are biased in the retracted position shown in FIG. 1 by a suitable spring 32. A raised wall 66 on the edge of thumb assembly 20 acts as a stop to prevent the latch members 22, 24 from retracting beyond their respective retracted positions shown in FIGS. 1 and 8. In a preferred embodiment, frame assembly 18, thumb assembly 20, latch members 22, 24, and guide rails 58, 60 are all made from a polycarbonate plastic composite material comprising about 20% glass fiber reinforcing strands and 15% PTFE added as a lubricant, although other materials, such as nylon or aluminum, could also be used as would be obvious to persons having ordinary skill in the art.

A pair of gate guide assemblies 34, 36 are mounted to the end of frame assembly 18, so that they cooperate with the latch members 22 and 24 in the manner previously described. Gate guide assemblies 34, 36 are essentially identical, so only guide gate assembly 36 is shown and described in detail herein. Referring now to FIGS. 3–7 simultaneously, gate guide assembly 36 is mounted to frame assembly 18 via mounting tab 63 and comprises a body portion 68 for slidably retaining gate 40 within a gate receiving slot 70 defined by a pair of retaining tabs 92, 94. Slot 70 also has a front end 80 and a rear end 82. Gate 40 comprises a pair of tabs 72 and 74 attached to respective top and bottom surfaces 41 and 43. Tabs 72 and 74 are adapted to retain and guide gate 40 within slot 70 between tabs 92 and 94. Gate 40 also includes a slotted surface 47 and a latch engaging surface 45 (best seen in FIGS. 1 and 12). Slotted surface 47 includes an elongate spring slot 76 for retaining a suitable biasing device, such as a spring 78, for biasing gate 40 in the extended position shown in FIG. 5. More specifically, spring 78 engages a tab 96 in gate receiving slot 70 that is also aligned with spring slot 76, so that the spring 78 urges gate 40 to remain in the extended position. In one preferred embodiment, gate guide assembly 34 also includes a lower gate 39 for engaging a corresponding latch (not shown) on a thumb assembly (not shown) for the second cartridge engaging assembly 16 (FIG. 2).

In one preferred embodiment, the body portion 68 of gate guide assembly 36 is molded from a polycarbonate plastic composite material comprising about 20% glass fiber reinforcing strands and 15% PTFE added as a lubricant, whereas gate 40 is molded from a nylon composite material comprising about 20% glass fiber reinforcing strands and about 15% PTFE added as a lubricant. Of course numerous other materials could be used for the body portion 68 and gate 40, as would be obvious to persons having ordinary skill in the art.

As was briefly described above, the cartridge hand off selection mechanism 10 according to one embodiment of the present invention includes four operating modes: A go-get mode (FIGS. 8 and 9) where the thumb assembly 20 is empty and is extended to engage a cartridge 30 positioned either in a magazine 44 or a cartridge reading device (not shown); a retrieve mode (FIG. 10), wherein the thumb assembly 20 and engaged cartridge 30 are retracted into the cartridge engaging assembly 14; a put mode (FIGS. 11 and 12), wherein the thumb assembly 20 and engaged cartridge 30 are extended from the cartridge engaging assembly 14 to insert or "put" the cartridge into magazine 44 or into a cartridge reading device (not shown); and a return mode which begins at the thumb position shown in FIG. 12, wherein the empty thumb assembly 20 is retracted from that position back (direction 50) into the cartridge engaging assembly 14 to the fully retracted position shown in FIG. 1.

Referring now to FIGS. 8 and 9 simultaneously, the go-get mode of operation begins with the step of moving the thumb assembly 20 in the extending direction 42 to engage a cartridge 30 aligned with the cartridge engaging assembly 14. In the example shown in FIG. 8, the cartridge 30 is stored in a storage magazine 44, although cartridge 30 could also be engaged from a suitable cartridge reading device (not shown). When the thumb assembly 20 is in the position shown in FIG. 8, the retracted latch members 22, 24 clear the respective beveled edges 52, 54 of respective extended gates 38, 40, allowing the thumb assembly 20 to continue moving in the extending direction 42 to engage cartridge 30. Referring now to FIG. 9, thumb assembly 20 has nearly reached the fully extended position, and the corners 84 and 86 of cartridge 30 have engaged with the respective beveled edges 88 and 90 of latch members 22 and 24, and moved the latch members 22, 24 to an extended position to allow them to move inwardly and engage respective slots 26 and 28 in cartridge 30 as a result of the bias force exerted by spring 32.

Once the latch members 22 and 24 have engaged the respective slots 26 and 28 in cartridge 30, the cartridge actuator assembly 56 will then stop the extension of the thumb assembly 20, and begin to move the thumb assembly 20 and engaged cartridge 30 in the retracting direction 50, as best seen in FIG. 10. In the retrieve mode shown in FIG. 10, the cartridge 30 is disengaged from engaging clips 46, 48 in magazine 44 and retracted into the cartridge engaging assembly 14. As the latch members 22 and 24 slide over the respective beveled edges 52, 54 of gates 38, 40, they push the gates 38 and 40 into the respective gate guide assemblies 34, 36 against spring pressure, thereby allowing the latch members 22, 24 and engaged cartridge 30 to be retracted without obstruction into the cartridge engaging assembly 14.

After the dual cartridge engaging assembly 12 has been moved to a new location by suitable apparatus (not shown) and aligned with a suitable cartridge receiver, such as a magazine 44 or a cartridge reading device (not shown), the cartridge hand off selection mechanism 10 may be operated in the put mode shown in FIGS. 11 and 12 to insert and release the cartridge 30 into the receiver. The put mode is initiated when the cartridge actuator assembly 56 begins to move the thumb assembly 20 and engaged cartridge 30 from the fully retracted position. As the thumb assembly 20 and engaged cartridge are moved in the extending direction 42, the latch members 22 and 24 will engage the respective extended gates 38 and 40, as best seen in FIG. 11. Continued movement of the thumb assembly 20 and the engaged cartridge 30 in the extending direction 42 causes the latch members 22, 24 to be extended outward along the respective gates 38, 40 as a result of the beveled edges 88, 90 of respective latch members 22, 24 being urged against the latch engaging surfaces 37, 45 of respective gates 38, 40, thus releasing their engagement with respective slots 26 and 28 in cartridge 30. See FIG. 12. In the fully extended position shown in FIG. 12, the cartridge assembly 30 will again be engaged with the respective engaging clips 46, 48 of magazine 44. Of course, the cartridge 30 could also be engaged with a suitable cartridge reader (not shown).

Finally, in the return mode of operation, the actuator 56 retracts the empty thumb assembly 20 back into cartridge engaging assembly 14 to the rest or home position shown in FIG. 1.

It is contemplated that the inventive concepts herein described may be variously otherwise embodied and it is intended that the appended claims be construed to include alternative embodiments of the invention except insofar as limited by the prior art.

What is claimed is:

1. Apparatus for actuating a latch member of a cartridge engaging assembly, comprising:
   a gate member located along a displacement path of said cartridge engaging assembly, said gate member being moveable from an extended position to a retracted position in a direction substantially transverse to the displacement path of said cartridge engaging assembly, said gate member and said latch member cooperating so that said latch member is allowed to pass said gate member when said gate member is in the extended position during a cartridge go-get operating state, so that said latch member moves said gate member to the retracted position when said latch member is engaged with the cartridge during a cartridge retrieve operating state, and so that said latch member abuts against and is deflected by said gate member when said gate member is in the extended position to release the cartridge during a cartridge put operating state.

2. The apparatus of claim 1, further comprising:
   a body portion comprising a gate receiving portion, said gate receiving portion comprising a front end and a rear end, wherein said gate member is reciprocatingly positioned within said gate receiving portion and is moveable between the extended position and the retracted position so that said latch member is allowed to pass said gate member during the cartridge go-get operating state and such that said latch member abuts against and is deflected by said gate member during the cartridge put operating state; and
   a biasing device operatively associated with said gate member for biasing said gate member to the extended position.

3. The apparatus of claim 1, wherein said gate member comprises a beveled front surface, wherein during the cartridge retrieve operating state said latch member engages said beveled front surface of said gate member and moves said gate member to the retracted position as said latch member passes said gate member.

4. The apparatus of claim 1 wherein said gate member comprises first and second tab portions and wherein said gate receiving portion is adapted to slidably receive said first and second tab portions.

5. The apperatus of claim 1 wherein said body portion further comprises a mounting portion for mounting said apparatus on a cartridge engaging assembly.

6. The apparatus of claim 1 wherein said body portion comprises two spaced apart gate receiving portions with a gate member positioned within each of said gate receiving portions, and further comprises a mounting portion positioned between said gate receiving portions for mounting said apparatus on a dual cartridge engaging assembly.

7. The apparatus of claim 6, wherein each gate member operates independently from the other.

8. A cartridge hand-off selection mechanism for selectively engaging and disengaging a cartridge, comprising:
   a cartridge engaging assembly moveable along a displacement path for selectively engaging and disengaging the cartridge and moving the cartridge along the displacement path;
   a latch member mounted to said cartridge engaging assembly and adapted to engage the cartridge, said latch member being mounted to said cartridge engaging assembly so that said latch member may be moved from a first position to a second position, the first position allowing said latch member to engage the cartridge and the second position allowing said latch member to release the cartridge;
   a gate member located along the displacement path of said cartridge engaging assembly and being moveable from an extended position to a retracted position in a direction substantially transverse to the displacement path of said cartridge engaging assembly, said gate member and said latch member cooperating so that said latch member is allowed to pass said gate member when said latch member is at the first position and during a cartridge go-get operating state; so that said latch member moves said gate member to the retracted position when said latch member is engaged with the cartridge and is at a position intermediate said first and second positions and during a cartridge retrieve operating state; and so that said latch member abuts against and is deflected to the second position by said gate member when said gate member is in the extended position and during a cartridge put operating state.

9. The cartridge hand-off selection mechanism of claim 8, wherein said gate member comprises:
   an elongate gate having a latch-engaging front end and a rear end;
   a body having a gate receiving portion adapted to receive the rear end of said elongate gate so that said elongate gate can be reciprocated in said body between the extended position and the retracted position; and
   a biasing device connected to said elongate gate for biasing said elongate gate to the extended position.

10. The cartridge hand-off selection mechanism of claim 9, wherein the latch-engaging front end of said elongate gate comprises a beveled surface, so that during the cartridge retrieve operating state said latch member engages said beveled front surface of said elongate gate and moves said elongate gate to the retracted position as said latch member passes said gate member.

11. The cartridge hand-off selection mechanism of claim 10, further comprising a latch biasing member connected to said latch member for biasing said latch member in the first position.

12. A cartridge hand-off selection mechanism for selectively engaging and disengaging a cartridge, comprising:
   a cartridge engaging assembly moveable along a displacement path for selectively engaging and disengaging the cartridge and moving the cartridge along the displacement path;

a latch member having a cartridge engaging tip portion pivotally mounted to said cartridge engaging assembly so that the cartridge engaging tip portion of said latch member may be moved from a first position to a second position, the first position allowing the cartridge engaging tip portion of said latch member to engage the cartridge and the second position allowing the cartridge engaging tip portion of said latch member to release the cartridge;

a latch biasing member connected to said latch member wherein said latch biasing member biases the cartridge engaging tip portion of said latch member in the first position;

a gate member located along the displacement path of said cartridge engaging assembly and being moveable from an extended position to a retracted position in a direction substantially transverse to the displacement path of said cartridge engaging assembly, said gate member and said latch member cooperating so that the cartridge engaging tip portion of said latch member is allowed to pass said gate member when said latch member is at the first position and during a cartridge go-get operating state; so that the cartridge engaging tip portion of said latch member moves said gate member to the retracted position when the cartridge engaging tip portion of said latch member is engaged with the cartridge and is at a position intermediate the first and second positions and during a cartridge retrieve operating state; and so that the cartridge engaging tip portion of said latch member abuts against and is deflected to the second position by said gate member when said gate member is in the extended position and during a cartridge put operating state; and a gate biasing member connected to said gate member wherein said gate biasing member biases said gate member to the extended position.

\* \* \* \* \*